United States Patent
LeCroy, Jr.

(10) Patent No.: US 6,910,660 B2
(45) Date of Patent: Jun. 28, 2005

(54) LASER GUIDANCE SYSTEM

(75) Inventor: Jerry Edward LeCroy, Jr., Huntsville, AL (US)

(73) Assignee: The Boeing Company, Chicago, IL (US)

( * ) Notice: Subject to any disclaimer, the term of this patent is extended or adjusted under 35 U.S.C. 154(b) by 116 days.

(21) Appl. No.: 10/355,361

(22) Filed: Jan. 31, 2003

(65) Prior Publication Data

US 2004/0149860 A1 Aug. 5, 2004

(51) Int. Cl.⁷ ............................ B64G 1/64; B64G 1/66; G01C 3/08
(52) U.S. Cl. .................. 244/161; 244/158 R; 244/160; 356/138; 356/139.03
(58) Field of Search ............................ 356/138, 139.03, 356/3, 4.01–5.15; 244/3.1–3.3, 158 R, 159, 160–173; 701/200, 207, 226, 300–302; 342/5–12

(56) References Cited

U.S. PATENT DOCUMENTS

| | | | | |
|---|---|---|---|---|
| 3,224,709 A | * | 12/1965 | Blizard | 244/161 |
| 3,285,533 A | * | 11/1966 | Jernigan, Jr. | 244/161 |
| 4,026,654 A | * | 5/1977 | Beaurain | 356/5.07 |
| 4,834,531 A | * | 5/1989 | Ward | 356/5.08 |
| 5,493,392 A | * | 2/1996 | Blackmon et al. | 244/171 |

* cited by examiner

Primary Examiner—Bernarr E. Gregory
(74) Attorney, Agent, or Firm—Artz & Artz, PC

(57) ABSTRACT

A guidance system includes a first laser device coupled to a mount, the first laser device adapted to generate a first laser signal having a first wavelength. A second laser device is also coupled to the mount and directed substantially parallel with the first laser device. The second laser device is adapted to generate a second laser signal having a second wavelength. A first photodiode is adapted to detect the first laser signal, retro-reflected from a first wavelength matched section of a reflector system, and the second laser, signal retro-reflected from a second wavelength matched section of the reflector system. The first photodiode is adapted to generate a first photodiode signal therefrom.

20 Claims, 4 Drawing Sheets

LASER GUIDANCE SYSTEM

TECHNICAL FIELD

The present invention relates generally to docking vehicles, and more particularly, to a laser guidance system for spacecraft docking.

BACKGROUND ART

Spacecraft proximity maneuvering, rendezvous, and docking procedures arise in most space missions, including those with commercial satellites, cargo transfer spacecraft, lunar mission spacecraft and various repair and service spacecrafts. It is well known that conventional spacecraft docking mechanisms include precise control of inertial propulsion systems, such as thrusters, to position an active craft (chaser) in motion relative to a passive craft (target) for docking. Inertial propulsion systems tend to be difficult to control and present a risk of misalignment and possible collision and damage to the spacecraft. Two current approaches to resolve this include manual docking and autonomous docking.

Typical manual docking systems include a video sensor or camera, which generates a visual output for use by a pilot to control docking and maneuvering. A difficulty encountered with manual systems is that it is often impractical or impossible for a pilot to manually maneuver a spacecraft for docking or berthing. For example, some space missions are tenuous and may endanger the pilot, while other space missions include unmanned spacecraft.

Docking operations between autonomous spacecraft require precise knowledge of relative vehicle position and attitudes. If the docking target vehicle is not equipped to generate attitude data for the docking chaser vehicle, the chaser must include sensors or computation-intensive data processing to determine relative position and attitude to the target. Docking based on visible light image data requires advantageous lighting, and it is difficult for cameras to provide adequate image detail for attitude and range estimation.

Further, docking with a disabled or passive vehicle is a design requirement for some missions. Therefore, the design solution should not require power or control from the docking target vehicle.

The disadvantages associated with current docking systems have made it apparent that a new docking system is needed. The new docking mechanism should be an autonomous rendezvous and docking system and should also provide an accurate docking alignment while requiring minimal input or response from the target spacecraft.

SUMMARY OF THE INVENTION

In accordance with one aspect of the present invention, a guidance system includes a first laser device coupled to a mount. The first laser device is adapted to generate a first laser signal having a first wavelength. A second laser device is also coupled to the mount and directed substantially parallel with the first laser device. The second laser device is adapted to generate a second laser signal having a second wavelength. A first photodiode is adapted to detect the first laser signal, retro-reflected from a first wavelength matched section of a reflector system, and the second laser signal retro-reflected from a second wavelength matched section of the reflector system. The first photodiode is adapted to generate a first photodiode signal therefrom.

In accordance with another aspect of the present invention, a method for docking a chaser vehicle, having a first laser aimed in a similar direction to a second laser, with a target vehicle, having a first retro-reflector aimed in a similar direction to a second retro-reflector, includes generating a first laser signal from the first laser. The first laser signal is received in the first retro-reflector through a first filter and retro-reflected. The first laser signal is received in the chaser vehicle. A second laser signal is generated from the second laser parallel with the first laser signal. The second laser signal is received in the second retro-reflector, through a second filter, and retro-reflected. The second laser signal is received in the chaser vehicle. The distance between the chaser vehicle and the target vehicle is analyzed along with necessary changes to yaw, pitch and roll.

Advantages of the present invention are that it is lightweight and it provides range and alignment data, thereby allowing a docking spacecraft to fly a target-centered approach trajectory to a docking target vehicle without requiring any power or control from the target vehicle. It also reduces need for high resolution video cameras and image processing for range and attitude estimation during terminal guidance once the docking spacecraft enters the outer boundary of the approach corridor and is aligned with the approach trajectory.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

DETAILED DESCRIPTION OF THE INVENTION

The present invention is illustrated with respect to a docking system particularly suited to the aerospace field.

The present invention is, however, applicable to various other uses that may require docking or vehicle interaction, as will be understood by one skilled in the art.

Figure 1:
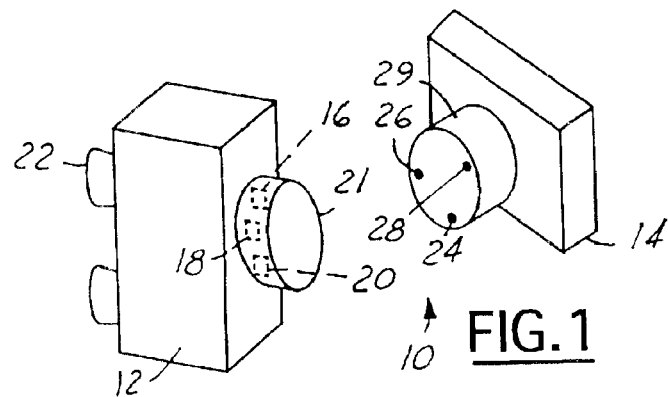
FIG. 1 illustrates a docking system in accordance with one embodiment of the present invention.
Figure 2:
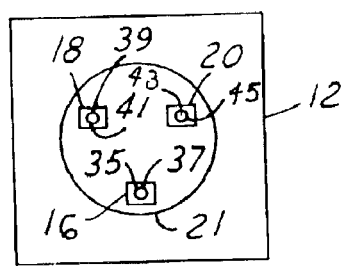
FIG. 2 illustrates a front view of the chaser spacecraft of FIG. 1.
Figure 3:
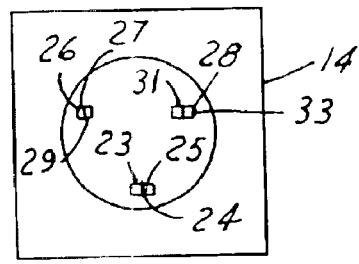
FIG. 3 illustrates a front view of the target spacecraft of FIG. 1.

Referring to FIGS. 1, 2 and 3, a docking system 10, including a target spacecraft 14 (first vehicle) and a chaser spacecraft 12 (second vehicle), is illustrated. The target 14 includes three passive guidance system alignment target reflector system/docking fixtures or reflector systems (first 24, second 26, and third 28) coupled to a docking interface 29. The chaser 12 includes three guidance systems (first 16, second 18, and third 20) coupled to a docking clamp 21, which will be discussed later in detail. The chaser 12 also includes inertial propulsion systems or attitude control devices 22, such as thrusters, control moment gyros, torque rods, etc.

The guidance systems 16, 18, 20 (also referred to as Laser Autonomous Approach Guidance Sensor Systems or LAAGSS) align with the reflector systems 24, 26, 28 when the chaser 12 docks with the target 14, as will also be discussed later. Optimally, three guidance systems 16, 18, 20 and three reflector systems 24, 26, 28 are included to provide approach trajectory positional alignment, range and relative vehicle attitude (roll, pitch and yaw) information through matching the guidance system 16, 18, 20 with the reflector systems 24, 26, 28.

The first guidance system 16 is coupled to the chaser vehicle 12 and includes a first laser device 35 and a second laser device 37, wherein the second laser 37 device is directed substantially parallel with the first laser device. The second guidance system 18 is coupled to the second vehicle 12 and includes a third laser device 39 and a fourth laser device 41, wherein the fourth laser 41 device is directed substantially parallel with the third laser device 39. The third guidance system 20, coupled to the second vehicle 12, includes a fifth laser device 43 and a sixth laser device 45, wherein the sixth laser 45 device is directed substantially parallel with the fifth laser device 43.

The target-side interface 29 includes a combination of view-restricted, notch-filtered corner cubes in the reflector systems 24, 26, 28 to reflect light from low-power laser diode sources in the guidance system 16, 18, 20 on the chaser vehicle 12. Each laser emits light pulses at a specific wavelength, and the reflector systems 24, 26, 28 on the target vehicle 14 are equipped with narrow-pass-band (interference or absorption) filters such that laser pulse energy is returned only from the one retro-reflector tuned for each laser source wavelength. Each reflector or retro-reflector is view-restricted, such that signal return from the reflector 24, 26, 28 is dependent on docking vehicle position and attitude (roll, pitch, and yaw) alignment relative to the docking target vehicle 14.

The reflector systems 24, 26, 28 are positioned on the target payload adaptor ring 29 in FIG. 1 as an illustrative example of a possible positioning arrangement, and one skilled in the art will realize numerous other arrangements. The reflector systems 24, 26, 28 are positioned as far away from each other as the circumference of the ring 29 permits, this spacing maximizes pitch and yaw guidance obtained by comparing time-of-flight range measurements from each transmitter/reflector pair.

The first reflector system 24, coupled to the target 14, includes a first corner cube 23 and a second corner cube 25 directed substantially parallel with the first corner cube 23. The second reflector system 26, coupled to the first vehicle 14, includes a third corner cube 27 and a fourth corner cube 29 directed substantially parallel with the third corner cube 27. The third reflector system 28 is coupled to the first vehicle 14 and includes a fifth corner cube 31 and a sixth corner cube 33 directed substantially parallel with the fifth corner cube 31.

The docking system 10 is merely illustrative of an arrangement and number of guidance system and reflector systems on two spacecrafts 12, 14 and is not meant to be limiting. For example, the present guidance system 16, 18, 20 could be implemented in any type of spacecrafts, objects, or vehicles requiring docking, such as airplanes, seagoing vessels, or land vehicles. Additionally, although three guidance system 16, 18, 20 and three reflector systems 24, 26, 28 are illustrated, it is to be understood that any number of guidance system and reflector systems may be included depending on desired parameter restrictions, as will be understood by one skilled in the art.

Figure 4:
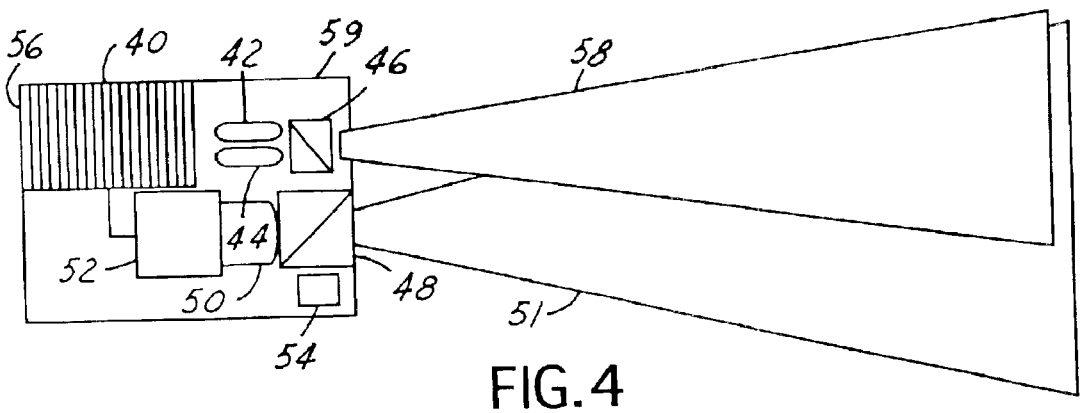
FIG. 4 illustrates a cutaway view of one of the guidance system sensor package in accordance with FIG. 1.

Referring to FIG. 4, a guidance system 40, in accordance with another embodiment of the present invention, is illustrated. The guidance system 40 includes at least two alternate wavelength laser diodes 42, 44 radiating light through a first reflectance pellicle 46. The guidance system 40 also includes a second reflectance pellicle 48, through which a telescope 50 focuses reflected light from the lasers 42, 44, which is received in a first diode or avalanche photodiode 52 (APD). A second photodiode 54 receives light through both the pellicles 46, 48. A controller 56 receives signals from the APD 52 and the second photodiode 54, controls the lasers 42, 44, and transmits approach trajectory navigation data to the vehicle guidance system. The aforementioned components may be coupled to a housing or mount structure 59 or alternately coupled to the chaser spacecraft as individual units.

A first laser device or laser diode 42 emitting a first wavelength and a second laser device or laser diode 44 emitting a second wavelength are illustrated. The first laser diode 42 generates a first laser signal having a first wavelength, and the second laser diode 44 generates a second laser signal having the second wavelength. The two lasers 42, 44 are adjacently positioned and aimed in the same direction and substantially parallel to one another The lasers 42, 44 receive activation signals from the controller 56 and sequentially emit beams 58 or pulses of light energy through the first pellicle 46. The beams 58 overlap and form an illumination field for the guidance system 40, which will be discussed later. The lasers 42, 44 are embodied as diode lasers; however, any form of focused and concentrated light is included in alternate embodiments of the present invention.

As discussed in FIG. 1, second and third guidance systems are included in one embodiment of the present invention. These guidance system include similar components to the first guidance system 40, however, the included laser diodes are embodied as having differing wavelengths thereto.

The second guidance system includes third and fourth laser diodes. The third laser diode generates a third laser signal having a third wavelength, and the fourth laser diode is directed substantially parallel with the third laser diode and generates a fourth laser signal having a fourth wavelength. The third guidance system includes a fifth and sixth laser diode. The fifth laser diode generates a fifth laser signal having a fifth wavelength. The sixth laser diode is directed substantially parallel with the fifth laser diode and generates a sixth laser signal having a sixth wavelength.

The first pellicle 46 and the second pellicle 48 are embodied as standard uncoated pellicles reflecting a fraction of the incident laser light beams 58 and thereby generate low-intensity side beams. These pellicles 46, 48 avoid second surface reflections which conventional beam splitting prisms might cause. The first pellicle 46 is positioned in the path of the beam from the two lasers 42, 44. The second pellicle 48 is positioned in front of the APD 52 and reflects laser light thereto from the first pellicle 46 from the lasers 42, 46.

The embodied telescope 50 receives laser signals 51 reflected from the target reflectors and laser signals reflected through the pellicles 46, 48. The telescope 50 includes a variable aperture, which can be closed to reduce energy transmission and resultant saturation of the APD detector during operations at narrow docking range, as will be understood by one skilled in the art.

The first photodiode or avalanche photodiode 52 detects pulses from the lasers 42, 44 and responds by generating a first photodiode signal. It is to be understood that numerous types of photodiodes and light detecting devices are also applicable to the present invention. The APD 52 is included to generate timing pulses when receiving both the initial and reflected pulses from the lasers 42, 44, and to measure return pulse intensity from each so that relative pulse intensity from lasers 42 and 44 may be compared.

The second photodiode 54 measures output from the lasers 42, 44 as reflected from the two pellicles 46, 48. Measurement data from second photodiode 54 allows closed-loop laser control by the controller 56 such that the APD 52, which can be saturated by high intensity light pulses, receives a laser signal of a magnitude that can be supported therein. The second photodiode 54 sends signals to the controller 56 from the laser output amplitude control, as will be understood by one skilled in the art. An alternate guidance system 40 includes lasers 42, 44 including internal monitoring of laser magnitude and do not, therefore, require this second photodiode 54.

The controller 56 receives signals from the APD 52 and the second photodiode 54, controls the lasers 42, 44, computes guidance data from timing and amplitude measurements of the reflected laser pulses, and transmits guidance data to the vehicle guidance system. The controller 56 includes a standard power supply, and timing and control electronics, known in the art. The controller 56 responds to signals from the APD 52 and second photodiode 54 by activating thrusters or other attitude control devices to align the chaser spacecraft for docking. The controller receives APD signals and calculates the distance from the target by taking the return pulse delay time divided by two and multiplying that result by the speed of light.

Figure 5:
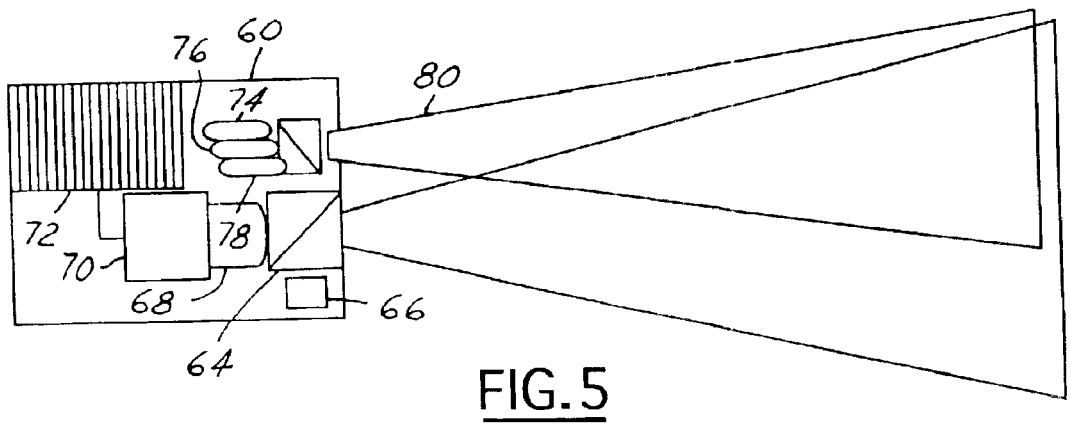
FIG. 5 illustrates an alternate embodiment of a cutaway view of one of the guidance system sensor package.

Referring to FIG. 5, an alternate embodiment of the guidance system sensor package 60 is illustrated. This embodiment includes the two pellicles 62, 64, the photodiode 66, the telescope 68, the APD 70 and the controller 72, as in FIG. 4. The guidance system 60 also includes three alternate wavelength laser diodes 74, 76, 78. These lasers 74, 76, 78 generate a combined beam 80, which is received within the APD FOV 82 following reflection. Numerous other lasers and laser configurations may be added to the guidance system 60 to increase course alignment data.

Figure 6:
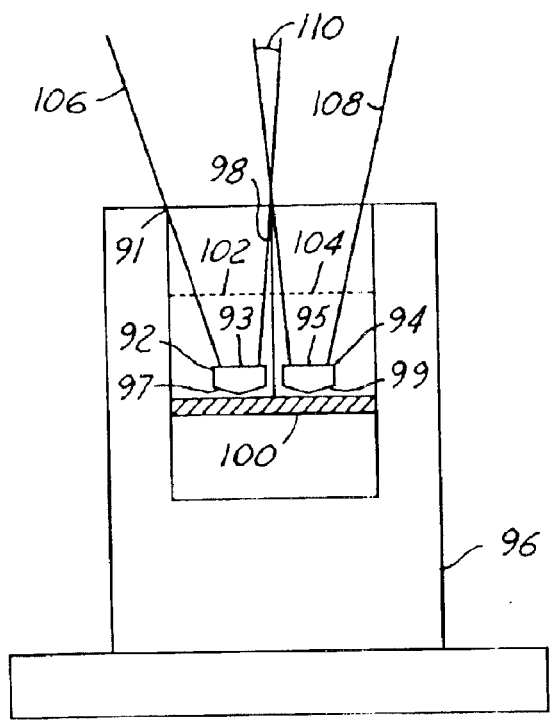
FIG. 6 illustrates a cutaway view of one of guidance system alignment target reflector layout in accordance with FIG. 1.

Referring to FIG. 6, a passive guidance system alignment target reflector system 90, including two corner cubes 92, 94, is illustrated. The corner cubes 92, 94 are coupled to a housing 96 and aimed in the same direction through an aperture 91 in the housing 96. The corner cubes 92, 94 include a face 93, 95 and a back 97, 99. A shield 98 is positioned between and orthogonal to the faces 93, 95 of the two corner cubes 92, 94. A non-reflective backing 100 is coupled to the housing 96 facing the backs 97, 99 of the corner cubes 92, 94. A first filter 102 is positioned in front 93 of the first corner cube 92, and a second filter 104 is positioned in front 99 of the second corner cube 94. The two filters 102, 104 are separated by the shield 98.

Filters 102, 104 restrict retroreflection of laser light from the guidance system sources through the corner cubes 92, 94. The corner cubes 92, 94 include a face 93, 95 and a back 97, 99. The face 93, 95 receives the laser beam from the guidance system. The chaser is centered on the correct approach path when return signals from both corner cubes 92, 94 are generated and of equal amplitude. As the chaser vehicle departs from the desired approach path, one of the corner cubes 92, 94 begins to be obscured from the respective laser by the shield 98, attenuating the return signal from that laser and indicating the magnitude and direction of. Translational correction required to restore the chaser to the desired approach corridor 110.

The shield 98 separates the filters 102, 104 and the corner cubes 94, 94 and is orthogonal to the faces 93, 95. The shield 98 limits the FOV 106, 108 of the corner cubes 92, 94 such that a longer shield 98 decreases the FOV 106, 108 and a shorter shield 98 increases the FOV 106, 108. In other words, the first corner cube 92 has a FOV 106 restricted by the shield 98 and the aperture 91. The second corner cube 94 has a FOV 108 restricted by the shield 98 and the aperture 91. The two FOVs 106, 108 intersect in an alignment zone 110 or approach corridor. The alignment zone course width may be adjusted to suit a specific vehicle's navigation requirements by adjusting the heights of aperture 91 and shield 98.

The first filter 102 is embodied as a short wavelength narrow-pass-band filter, and the second filter 104 is embodied as a long wavelength narrow-pass-band filter. The first filter 102 passes laser energy from the first laser and the second filter 104 passes laser energy from the second laser.

As discussed regarding FIG. 1, one embodiment of the present invention includes second and third reflector systems having similar components to the first reflector system 90. The filters on the second and third reflector systems are, in one embodiment, matched to the second and third guidance system lasers.

The second reflector system includes third and fourth corner cubes. The third corner cube receives a third laser signal through a third filter matched to a third wavelength, and the fourth corner cube receives a fourth laser signal through a fourth filter matched to a fourth wavelength.

The third reflector system includes fifth and sixth corner cubes. The fifth corner cube receives a fifth laser signal through a fifth filter matched to a fifth wavelength, and the sixth corner cube receives a sixth laser signal through a sixth filter matched to a sixth wavelength.

Figure 7:
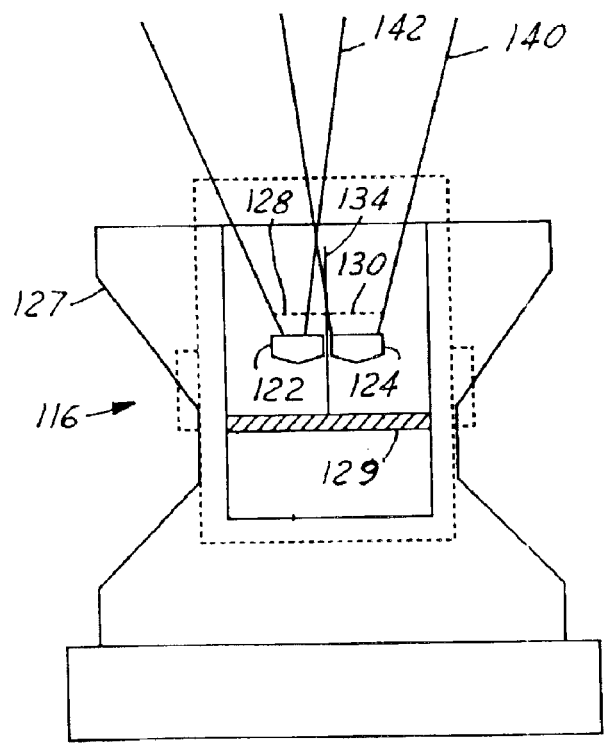
FIG. 7 illustrates a cutaway view of an alternate guidance system alignment target reflector layout in accordance with FIG. 1.
Figure 8:
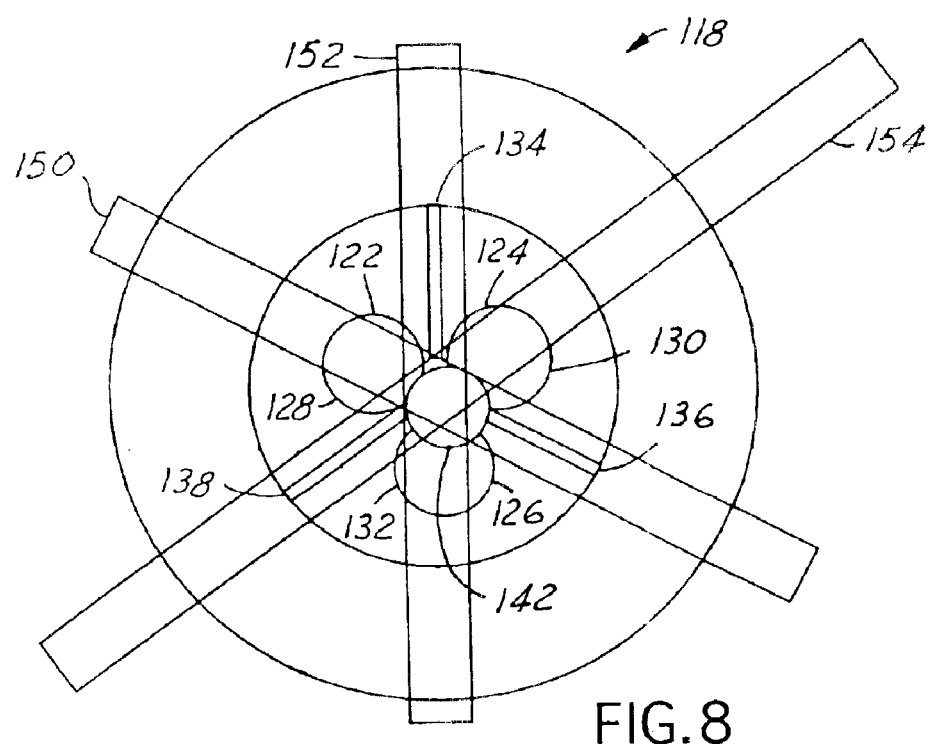
FIG. 8 illustrates a front view of the alternate guidance system alignment target reflector layout in accordance with FIG. 7.

Referring to FIGS. 7 and 8, a side view 116 and a front view 118 of an alternate embodiment of the panel passive guidance system alignment target reflector layout 120 are illustrated. The reflector 120 includes three corner cubes 122, 124, 126, each coupled to a housing 127 and having filters 128, 130, 132 of different wavelengths. Three shields (first 134, second 136, and third 138) separate the three corner cubes 122, 124, 126. A non-reflective back 129 is also positioned behind the corner cubes 122, 124, 126 to minimize irrelevant reflections.

The three corner cubes 122, 124, 126 are disposed equidistance to each other. Important to note; however, is that numerous alternate arrangements are also included in the present embodiment depending on the desired FOV 140 and acquisition corridor (central approach corridor 142).

The housing 127 is a substantially dual-conical shape designed for coupling to a chaser capture mechanism, as will be understood by one skilled in the art.

Three alignment zones 150, 152, 154 are defined by each pair of retro-reflectors (i.e. the corner cube 122, 124, 126 and the respective laser beam from a guidance system). The central approach corridor 142 is defined in the center zone where all three corner cubes 122, 124, 126 are visible. The chaser is on the correct approach path when return signals from all three corner cubes 122, 124, 126 are generated. As one of the corner cubes 122, 124, 126 becomes obscured from the respective laser, lower signal amplitude on the detected return signal will indicate the translational correction (magnitude and direction) required to re-center the chaser within the approach corridor 142.

Figure 9:
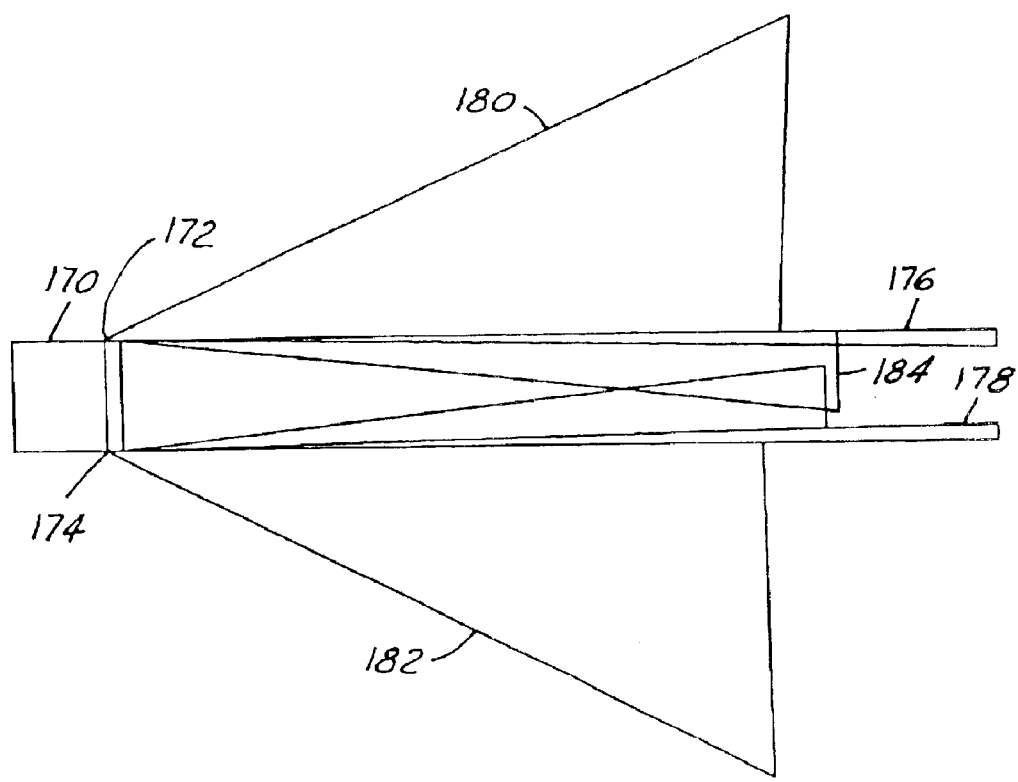
FIG. 9 illustrates a approach zones for a chaser spacecraft in accordance with another embodiment of the present invention.

Referring to FIG. 9, the approach zones for a chaser spacecraft 170, having two guidance system 172, 174, is illustrated. Two docking guidance corridors 176, 178 are illustrated, each matching a respective docking fixture (see FIG. 1). The coarse acquisition zones 180, 182 are the outer boundary acquisition zones, and the width thereof is defined by the acceptance angles of the respective corner cubes, the width of the housing aperture, and the shield geometry. (see FIG. 6). The terminal approach corridor is defined between the docking guidance corridors 176, 178.

Figure 10:
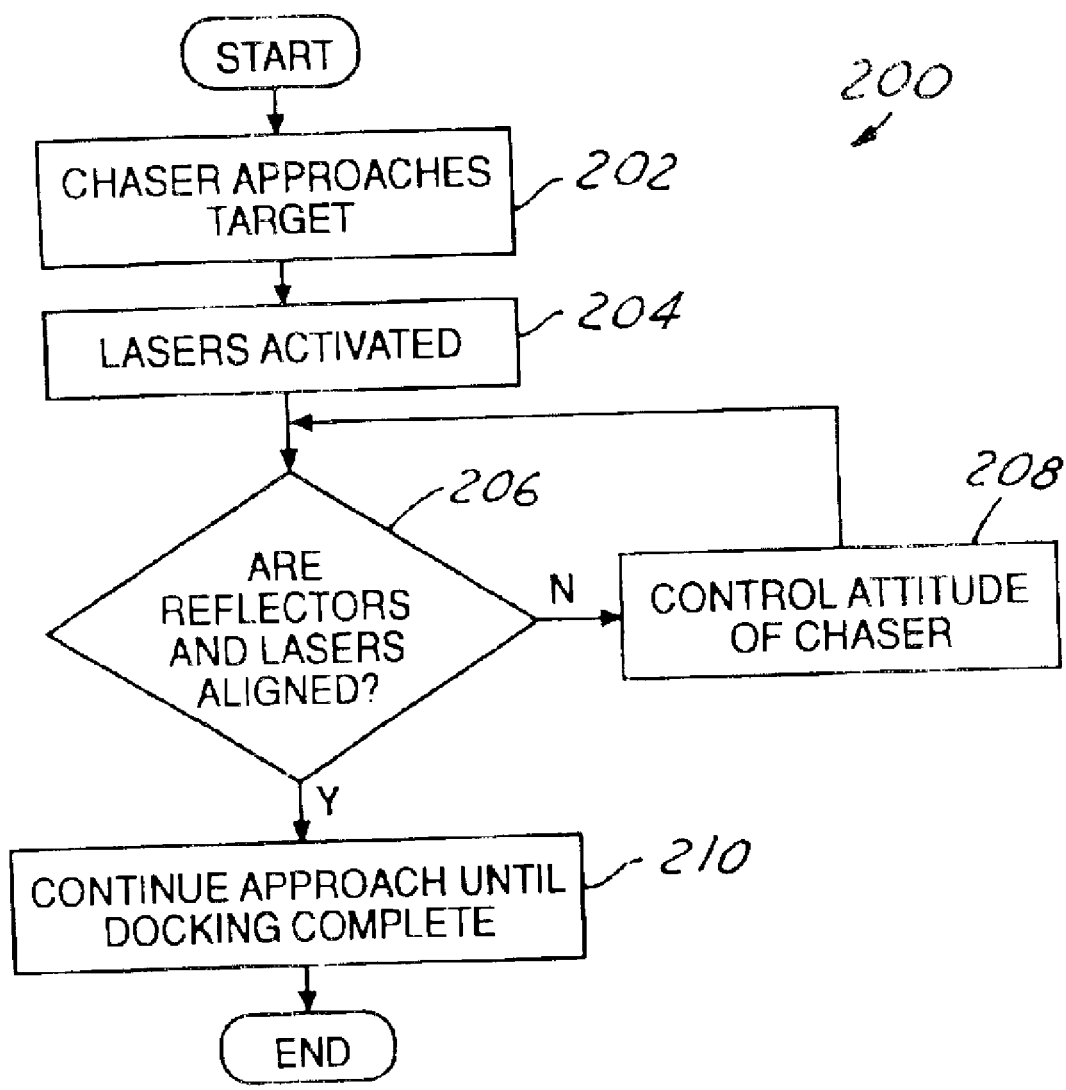
FIG. 10 illustrates a logic flow diagram of a method for docking spacecraft in accordance with another embodiment of the present invention.

Referring to FIG. 10, a logic flow diagram 200 of a method for docking a chaser spacecraft with a target spacecraft is illustrated. Logic starts in operation block 202 where the chaser spacecraft approaches the target either remotely or through manual control.

In operation block 204, the guidance systems are activated, either by manual or autonomous control or by the controller, and emit a series of laser pulses.

A check is then made in inquiry block 206 as to whether the passive guidance system alignment target reflector layout and the guidance system are aligned. In other words, a check is made whether each diode laser pulse is received through the matching filter to the respective reflector. If detected pulse amplitudes are of approximately equal amplitudes, the spacecraft is on the correct approach trajectory. If detected pulse amplitudes are unequal, in operation block 208, the controller estimates the trajectory alignment error, based on the reflector signal relative magnitudes, and transmits the error estimate to the vehicle guidance system. Position and attitude errors detected by the sensor controllers are precise and unambiguous, so that the vehicle guidance system can fire the chaser thrusters to correct the spacecraft position efficiently.

Otherwise, in operation block 210, the chaser continues approach to the target until the vehicle guidance system determines the distance is such that the chaser can initiate docking or berthing actions. In one embodiment, this includes a clamping mechanism on-board the chaser that couples to a receiving structure on the target. For example, one embodiment of the chaser includes a capture mechanism that clamps around the dual conical structure of the target illustrated in FIG. 7.

In operation, a method for docking a chaser vehicle, having a first laser aimed in a similar direction to a second laser, with a target vehicle, having a first retro-reflector aimed in a similar direction to a second retro-reflector, includes generating a first laser signal from the first laser. The first laser signal is received in the first retro-reflector through a first filter and retro-reflected. The first laser signal is received in the chaser vehicle. A second laser signal is generated from the second laser parallel with the first laser signal. The second laser signal is received in the second retro-reflector through a second filter and retro-reflected. The second laser signal is received in the chaser vehicle. The distance between the chaser vehicle and the target vehicle is analyzed along with necessary changes to yaw, pitch and roll.

In other words, the docking chaser vehicle sensors illuminate the docking target with laser diodes, obtaining corridor guidance from by detection of laser pulses returning from target retro-reflectors. Range between the vehicles is estimated by measuring time-of-flight between laser pulses initiation and return from each of three tracking sources. Relative attitude (pitch and yaw) data is obtained by a transform from differential ranges between the three sensor units. Relative roll attitude is obtained simultaneously with corridor guidance. Docking vehicle alignment error is determined by comparing relative signal returns from each of six source lasers.

From the foregoing, it can be seen that there has been brought to the art a new and improved docking system. It is to be understood that the preceding description of the preferred embodiment is merely illustrative of some of the many specific embodiments that represent applications of the principles of the present invention. For example, a vehicle, such as an airplane, spacecraft, or automobile could include the present invention for docking control. Numerous and other arrangements would be evident to those skilled in the art without departing from the scope of the invention as defined by the following claims.

What is claimed is:

1. A guidance system comprising:

a mount;

a first laser device coupled to said mount; said first laser device adapted to generate a first laser signal having a first wavelength;

a second laser device coupled to said mount and directed substantially parallel with said first laser device, said second laser device adapted to generate a second laser signal having a second wavelength different from said first wavelength;

a first photodiode adapted to detect said first laser signal retro-reflected from a first wavelength matched section of a reflector system and said second laser signal retro-reflected from a second wavelength matched section of said reflector system, said first photodiode adapted to generate a first photodiode signal therefrom;

an attitude control device;

an attitude control device actuator adapted to receive an adjustment signal and further adapted to activate said attitude control device in response thereto; and a controller adapted to receive said first photodiode signal, said controller further adapted to generate said adjustment signal in response thereto.

2. The system of claim 1 wherein said attitude control device comprises a thruster or a gimbal.

3. The system of claim 1 further comprising a second photodiode adapted to detect said first laser signal, said second laser signal, said first laser signal retro-reflected from said first wavelength matched section of said reflector system, and said second laser signal retro-reflected from said second wavelength matched section of said reflector system, said second photodiode adapted to generate a second photodiode signal therefrom.

4. The system of claim 3 further comprising a controller adapted to receive said second photodiode signal, said controller further adapted to generate a distance signal in response thereto.

5. The system of claim 1 further comprising a first reflectance pellicle and a second reflectance pellicle, wherein said first photodiode is adapted to detect said first laser signal retro-reflected from said first wavelength matched section of said reflector system and said second laser signal retro-reflected from said second wavelength matched section of said reflector system from a reflection from said first reflectance pellicle and said second reflectance pellicle.

6. The system of claim 1 wherein said first wavelength matched section comprises a first corner cube behind a first filter matched to said first wavelength.

7. The system of claim 6 wherein said second wavelength matched section comprises a second corner cube behind a second filter matched to said second wavelength, and wherein said first corner cube and said second corner cube are separated by a shield.

8. The system of claim 1 wherein said first photodiode comprises an avalanche photodiode.

9. The system of claim 1 wherein said first laser diode comprises an internal monitoring system adapted to control said first laser signal magnitude.

10. The system of claim 1 further comprising a telescope comprising an adjustable aperture, wherein said first photodiode is adapted to detect said first laser signal retro-reflected from said first wavelength matched section of said reflector system and said second laser signal retro-reflected from said second wavelength matched section of said reflector system through said telescope.

11. The system of claim 1 further comprising a third laser device coupled to said mount and directed substantially parallel with said first laser device and said second laser device, said third laser device adapted to generate a third laser signal having a third wavelength, and
wherein said first photodiode is adapted to detect said third laser signal retro-reflected from a third wavelength matched section of said reflector system, said first photodiode further adapted to generate said first photodiode signal therefrom.

12. A method for docking a chaser vehicle, having a first laser aimed in a similar direction to a second laser, with a target vehicle, having a first retro-reflector aimed in a similar direction to a second retro-reflector, comprising:
generating a first laser signal from the first laser;
receiving said first laser signal in the first retro-reflector;
retro-reflecting said first laser signal;
receiving said first laser signal in the chaser vehicle;
generating a second laser signal from the second laser parallel with said first laser signal;
receiving said second laser signal in the second retro-reflector;
retro-reflecting said second laser signal;
receiving said second laser signal in the chaser vehicle; and
determining an attitude control signal in response to said first laser signal and said second laser signal,
wherein the step of determining an attitude control signal further comprises determining distance between the chaser vehicle and the target vehicle; or
determining necessary changes in roll of the chaser vehicle for docking with the target vehicle; or
determining necessary changes in pitch of the chaser vehicle for docking with the target vehicle; or
determining necessary changes in yaw of the chaser vehicle for docking with the target vehicle.

13. A docking system including a first vehicle and a second vehicle comprising:
a first reflector system, coupled to the first vehicle, comprising a first corner cube and a second corner cube directed substantially parallel with said first corner cube, wherein said first corner cube is adapted to receive a first laser signal through a first filter matched to a fast wavelength and wherein said second corner cube is adapted to receive a second laser signal through a second filter matched to a second wavelength;
an attitude control device coupled to the second vehicle;
an attitude control device actuator coupled to the second vehicle and adapted to receive an adjustment signal and further adapted to activate said attitude control device in response thereto; and
a first guidance system, coupled to the second vehicle, comprising a housing, a first laser device, a second laser device, a first photodiode and a controller,
said first laser device coupled to said housing, said first laser device adapted to generate said first laser signal having said first wavelength,
said second laser device coupled to said housing and directed substantially parallel with said first laser device, said second laser device adapted to generate said second laser signal having said second wavelength,
said first photodiode adapted to detect said first laser signal retro-reflected from said first corner cube, said first photodiode further adapted to detect said second laser signal retro-reflected from said second corner cube, said first photodiode adapted to generate a first photodiode signal in response to said first laser signal and said second laser signal,
said controller adapted to receive said first photodiode signal said controller further adapted to generate said adjustment signal in response thereto.

14. The system of claim 13 further comprising a first reflectance pellicle and a second reflectance pellicle, wherein said fast photodiode is adapted to detect said first laser signal retro-reflected from said first corner cube and said second laser signal retro-reflected from said second corner cube from a reflection from said first reflectance pellicle and said second reflectance pellicle.

15. The system of claim 13 further comprising an opaque shield disposed between said first corner cube and said second corner cube.

16. The system of claim 15, further comprising a third corner cube, a second opaque shield and a third opaque shield, said third corner cube directed substantially parallel with said first corner cube and said second corner cube, said second shield disposed between said first corner cube and said second corner cube, said third shield disposed between said third corner cube and said second corner cube.

17. The system of claim 13 wherein said attitude control device comprises a thruster or a gimbal.

18. The system of claim 13 further comprising a telescope comprising an adjustable aperture, wherein said first photodiode is adapted to detect said first laser signal and said second laser signal through said telescope.

19. The system of claim 13 further comprising a second reflector system, coupled to the first vehicle, comprising a third corner cube and a fourth corner cube directed substantially parallel with said third corner cube, wherein said third corner cube is adapted to receive a third laser signal through a third filter matched to a third wavelength and wherein said fourth corner cube is adapted to receive a fourth laser signal through a fourth filter matched to a fourth wavelength; and a second guidance system, coupled to the second vehicle, comprising a third laser device and a fourth laser device, said third laser device adapted to generate said third laser signal having said third wavelength, said fourth laser device directed substantially parallel with said third laser device, said fourth laser device adapted to generate said fourth laser signal having said fourth wavelength.

20. The system of claim 19 further comprising a third reflector system, coupled to the first vehicle, comprising a fifth corner cube and a sixth corner cube directed substantially parallel with said fifth corner cube, wherein said fifth corner cube is adapted to receive a fifth laser signal through a fifth filter matched to a fifth wavelength and wherein said sixth corner cube is adapted to receive a sixth laser signal through a sixth filter matched to a sixth wavelength; and a third guidance system, coupled to the second vehicle, comprising a fifth laser device and a sixth laser device, said fifth laser device adapted to generate said fifth laser signal having said fifth wavelength, said sixth laser device directed substantially parallel with said fifth laser device, said sixth laser device adapted to generate said sixth laser signal having said sixth wavelength.

* * * * *